(12) United States Patent
Kassai et al.

(10) Patent No.: US 6,749,433 B2
(45) Date of Patent: Jun. 15, 2004

(54) NEONATE DUMMY

(75) Inventors: Kenzou Kassai, Osaka (JP); Tsuguhiro Fukuda, Osaka (JP); Yamei Liu, Osaka (JP)

(73) Assignees: Aprica Kassai Kabushikikaisha, Osaka (JP); GESAC, Inc., Boonsboro, MD (US)

( * ) Notice: Subject to any disclaimer, the term of this patent is extended or adjusted under 35 U.S.C. 154(b) by 0 days.

(21) Appl. No.: 10/214,283

(22) Filed: Aug. 6, 2002

(65) Prior Publication Data

US 2004/0029090 A1 Feb. 12, 2004

(51) Int. Cl.[7] .......................... G09B 23/32; G01N 33/00
(52) U.S. Cl. ....................... 434/267; 434/262; 73/866.4
(58) Field of Search ................... 434/270, 274, 434/267, 262; 73/866.4

(56) References Cited

U.S. PATENT DOCUMENTS

| | | | |
|---|---|---|---|
| 3,557,471 A | * 1/1971 | Payne et al. | ................. 434/270 |
| 3,877,156 A | 4/1975 | Itoh | |
| 4,395,235 A | 7/1983 | Becker | |
| 5,259,765 A | 11/1993 | Richards | |
| 5,528,943 A | * 6/1996 | Smrcka et al. | ............. 73/866.4 |
| 5,741,989 A | 4/1998 | Viano et al. | |
| 5,941,757 A | 8/1999 | Jurmain et al. | |
| 6,325,454 B1 | * 12/2001 | Maier | ......................... 297/253 |

OTHER PUBLICATIONS

GM Press Release, Mar. 19, 1997 "The History of Crash Test Dummies".*
NHTSA, "Child Restraint Air Bag Interaction CRABI 12 Month Old", Jan. 23, 2002.*
www.rta.nsw.gov "ATD—Dummy Facilities".*
SR Roberts, S Kalayanasundaram "model Development of Crabi–6 Crash–Test Dummies for Side–Ipact Simulations".*

* cited by examiner

Primary Examiner—Derris H. Banks
Assistant Examiner—Dmitry Suhol
(74) Attorney, Agent, or Firm—W. F. Fasse; W. G. Fasse

(57) ABSTRACT

A neonate dummy make it possible to sense or measure a movement of the head of a neonate, the values of impacts applied to the thoracic part and the abdominal part (including the lumbar part) of the neonate, and the value or magnitude of the effect on the cervical vertebrae, as well as to clarify the mechanism of cervical disorder resulting from an impact in a car crash or the like. This neonate dummy includes a head part, a body part (including a lumbar part), arm parts and leg parts. A bar-shaped backbone member corresponding to the backbone of a neonate is provided in the body part (including a lumbar part), and a neck part is formed on an upper region of the backbone member. A triaxial acceleration sensor is provided on the centroidal position of the head part. Further triaxial acceleration sensors are provided on positions of the backbone member corresponding to the upper and lower ends of the cervical vertebrae of the neonate respectively, and additional triaxial acceleration sensors are provided on the centroidal positions of a thoracic part and a lumbar part respectively.

10 Claims, 3 Drawing Sheets

NEONATE DUMMY

BACKGROUND OF THE INVENTION

1. Field of the Invention

The present invention relates to a dummy employed for a dynamic test on a car crash, and more specifically, it relates to the structure of a neonate dummy.

2. Description of the Background Art

The new Japanese Road Traffic Act coming into force in Apr. 2000 obligates a car driver to employ a neonate safety seat for an automobile (hereinafter simply referred to as a child seat) for a child, including a neonate, under the age of six. According to JIS and standards provided by ECE, FMVSS and the Ministry of Land, Infrastructure and Transport, child seats are classified into several types in response to the weights of children along with standards for a neonate. In these standards, a dynamic test is provided with reference to head-on and rear-end car crashes, and a dummy employed for such a dynamic test is specified for each type of the child seat.

A dummy (hereinafter referred to as a TNO PO dummy) of a Dutch research organization is specified for the dynamic test on a child seat for a neonate. This TNO PO dummy is set to 3400 g in mass, and has an integral body structure.

The structure of the body of a neonate is now discussed. According to the World Health Organization (WHO), a neonate born after at least 37 gestational weeks with a birth weight of at least 2500 g is called a normally born neonate. Therefore, it is assumed that the term "neonate" employed in this specification indicates the normally born neonate defined by WHO.

The body of a neonate is not a miniature of an adult body. The structure and functions of the neonatal body are so premature that an accident may more seriously influence the neonatal body as compared with an adult body. The skeleton and functions of the neonatal body develop to degrees close to those of the adult body conceivably at the age of about twelve. Therefore, the characteristics of the neonatal body must be taken into due consideration.

(1) Head of Neonate

A neonate has a big head, occupying about 30% of the total weight, and a flabby neck. Consequently, the head of the neonate is readily shaken when receiving an impact. The thin scalp of the neonate has weak cushioning properties for protecting the skull, which is thin and flabby with thin and fragile dura mater. The facial bones are small as compared with the skull. Consequently, the head is more readily affected than the face. Cerebral vessels (pontine veins) are so thin and fragile by nature that the neonate readily bleeds when strongly shaken.

(2) Cervical Vertebrae of Neonate

The neonate has a big head and a flabby neck. When an impact is applied to the head, therefore, a large load is applied to the cervical vertebrae forming the neck. The centra (vertebrae) forming the cervical vertebrae, the ligaments forming the basivertebral joints connecting the same and muscles are undeveloped. The degree of freedom in movement of the cervical vertebrae is so large that particularly a baby under the age of one hardly has resistance against external force. The cervical vertebrae are so elastic and dilatable that the same are readily dislocated or fractured when excessively bent or expanded. Therefore, compression or ablation on cervical medullae in the cervical vertebrae may result in a critical damage. In the neonatal body, regions located on high positions of the cervical vertebrae are particularly readily damaged as compared with the adult body.

Thus, it is extremely important to protect the brain and the cervical vertebrae of the neonate so that the head does not collide with a hard substance and the neck is not excessively elongated or shaken when an impact is applied particularly to the head of the neonate.

In the current dynamic test, the behavior of the head part, the thoracic part and the abdominal part of the aforementioned TNO PO dummy following a car crash and the values of affection on these regions can be recognized to some extent. However, all regions of the body of the TNO PO dummy are integrated and hence the behavior of the head part, the thoracic part and the abdominal part and the values of affection on these regions cannot be correctly recognized. Further, the behavior of the cervical vertebrae regarded as particularly important and the value of affection thereon cannot be recognized. This is because the TNO PO dummy having an integral structure cannot correctly replicate the structure of a neonatal body having a flabby neck.

SUMMARY OF THE INVENTION

Accordingly, the present invention has been proposed in order to solve the aforementioned problems, and an object thereof is to develop a neonate dummy enabling grasp of a movement of the head of a neonate, the values of impacts applied to the thoracic part and the abdominal part (including the lumbar part) and the value of affection on the cervical vertebrae as well as clarification of the mechanism of cervical disorder resulting from an impact.

In order to attain the aforementioned object, the neonate dummy, employed for a dynamic test, according to the present invention comprises a head part and a body part including a neck part coupled with the aforementioned head part, while the aforementioned head part and the aforementioned body part are separated from each other, i.e. not integrally connected, due to the interposed neck part.

The head part and the body part are separated from each other so that the head part behaves equally to the head of an actual neonate in the dynamic test, whereby a movement of the head of the neonate and the value of affection applied to the head can be correctly grasped.

According to the present invention, the aforementioned body part preferably includes a bar member corresponding to the backbone of a neonate, for forming the aforementioned neck part on an upper region of the aforementioned bar member. According to this structure, the neonate dummy replicates the skeleton of a neonate so that the head part and the neck part behave equally to the head and the neck of an actual neonate in the dynamic test, whereby movements of the head part and the neck part as well as the values of affection applied to the head part and the neck part can be correctly grasped.

According to the present invention, the aforementioned head part is preferably pivotally coupled to the aforementioned neck part to be anteroposteriorly rotatable. According to the present invention, further, the aforementioned head part is preferably pivotally coupled to the aforementioned neck part to be laterally rotatable. According to this structure, the neonatal dummy more correctly replicates the skeleton of a neonate so that the head part and the neck part behave more equally to the head and the neck of an actual neonate in the dynamic test, whereby movements of the head part and the neck part as well as the values of affection applied to the head part and the neck part can be more correctly grasped.

According to the present invention, acceleration sensors are preferably provided on positions corresponding to the upper and lower ends of the cervical vertebrae of a neonate respectively. Thus, the amount of shear of the cervical vertebrae of the neonate can be measured in the dynamic test, for correctly grasping a movement of the neck part and the value of affection applied to the neck part. Consequently, the mechanism of cervical disorder resulting from an impact can be clarified.

According to the present invention, the aforementioned body part preferably includes a thoracic part and a lumbar part, and acceleration sensors are preferably provided on the centroidal position of the aforementioned head part, the centroidal position of the aforementioned thoracic part and the centroidal position of the aforementioned lumbar part respectively. Thus, movements of the head part and the neck part as well as the values of affection applied to the head part and the neck part can be more correctly grasped in the dynamic test.

According to the present invention, the aforementioned body part preferably includes arm parts and leg parts, and joints moving similarly to those of the body of a neonate are provided on the aforementioned arm parts and the aforementioned leg parts respectively. Thus, behavior of the body of a neonate can be correctly grasped in the dynamic test.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
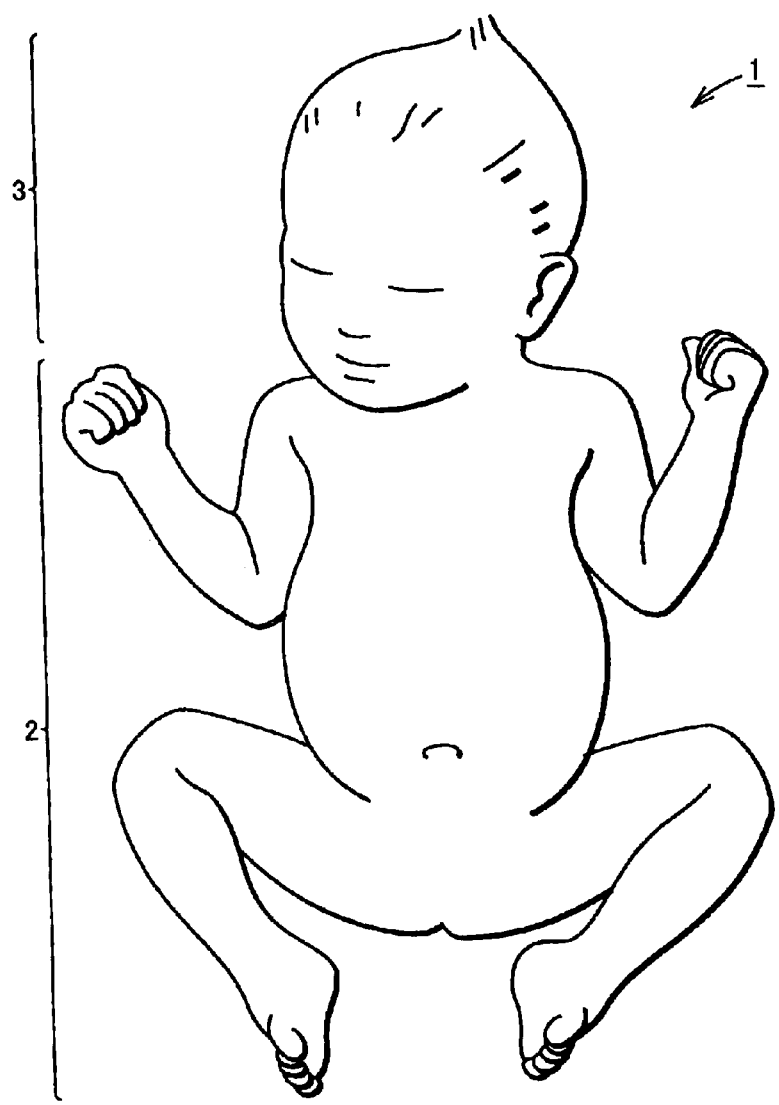
FIG. 1 illustrates the habitus of a neonate 1 having a birth weight of about 2572 g.

The structure of a neonate dummy according to an embodiment of the present invention is now described with reference to the drawings. FIG. 1 illustrates the habitus of a neonate 1 having a birth weight of about 2572 g. Referring to FIG. 1, it is understood that the neonate 1 has a big head 3 as compared with its body 2. The neck of the neonate 1 is still premature (unfixed), and hence it can be said preferable to keep the neonate 1 laid down unless it is held in the arms of a parent or the like, not to impose a burden on its neck. Also in consideration of the abdominal aspiration of the neonate, it can be said preferable to keep the neonate 1 laid down, not to compress the body 2.

Figure 2:
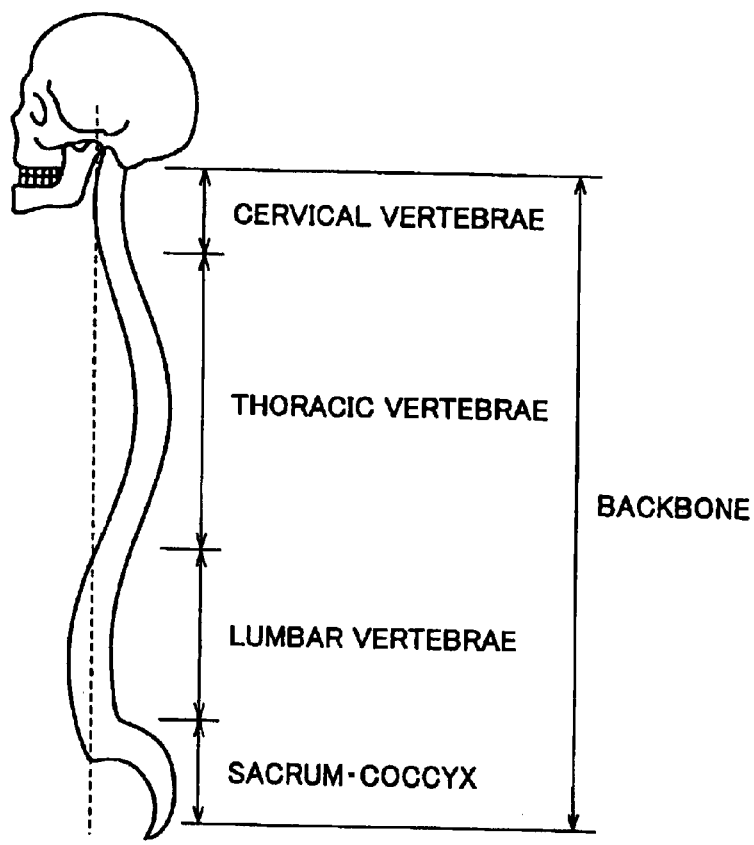
FIG. 2 is a model diagram showing the structure of the backbone of an adult.
Figure 3:
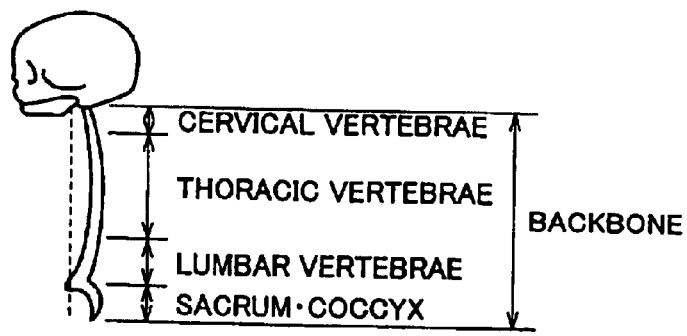
FIG. 3 is a model diagram showing the structure of the backbone of a neonate.

FIG. 2 is a model diagram showing the structure of the backbone of an adult. The backbone is formed by the cervical vertebrae, the thoracic vertebrae, the lumbar vertebrae and the sacrum/coccyx from under the head. The regions of the cervical vertebrae and the lumbar vertebrae are curved forward, while the regions of the thoracic vertebrae and the sacrum/coccyx are curved rearward. FIG. 3 is a model diagram showing the structure of the backbone of a neonate. While the backbone of the neonate is formed by the cervical vertebrae, the thoracic vertebrae, the lumbar vertebrae and the sacrum/coccyx similarly to the adult backbone, these regions are so premature that the cervical vertebrae, the thoracic vertebrae and the lumbar vertebrae are integrally curved rearward and the sacrum/coccyx is curved rearward similarly to the adult. As understood from the process of development of the backbone, it can be said that the structures of the bodies of a neonate and an adult are absolutely different from each other.

Figure 4:
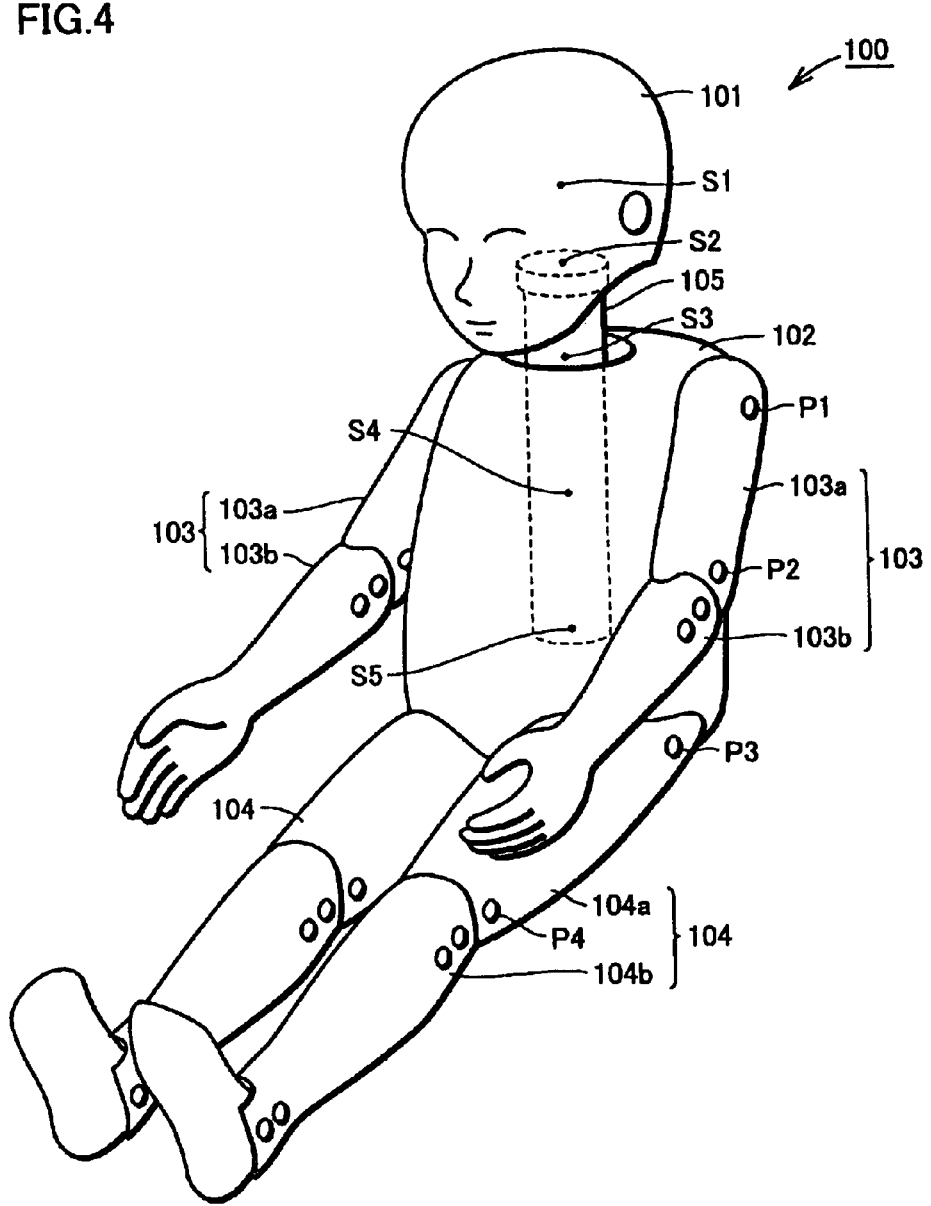
FIG. 4 is a general perspective view showing the structure of a neonate dummy 100 according to an embodiment of the present invention.

FIG. 4 is a general perspective view showing the structure of a neonate dummy 100 according to the embodiment of the present invention. This neonate dummy 100 comprises a head part 101, a body part (including a lumbar part) 102, arm parts 103 and leg parts 104. A bar-shaped backbone member 105 corresponding to the backbone of a neonate is provided in the body part (including a lumbar part) 102, and a neck part is formed on an upper region of the backbone member 105. The head part 101, separated from the body part (including a lumbar part) 102, is pivotally coupled to the upper end of the backbone member 105 by a well-known technique such as a universal joint, to be anteroposteriorly and laterally rotatable. The rotation torque of the head part 101 with respect to the backbone member 105 can be readily set by tightening a bolt or the like.

Each arm part 103 is coupled to the body part 102 by a pivot part P1 to be movable similarly to the joint on each shoulder of the neonate. This arm part 103 has a brachial part 103a and an antebrachial part 103b, which are coupled with each other by a pivot part P2 to be movable similarly to the elbow joint of the neonate.

Each leg part 104 is coupled to the body part 102 by a pivot part P3, to be movable similarly to the hip joint of the neonate. The leg part 104 has a thigh part 104a and a calf part 104b, which are coupled with each other by a pivot part P4 to be movable similarly to the knee joint of the neonate.

A triaxial acceleration sensor S1 is provided on the centroidal position of the head part 101. Further, triaxial acceleration sensors S2 and S3 are provided on positions of the backbone member 105 corresponding to the upper and lower ends of the cervical vertebrae of the neonate respectively, while triaxial acceleration sensors S4 and S5 are provided on the centroidal positions of the thoracic part and the lumbar part respectively.

The neonate dummy 100 is designed to match in mass balance with an actual neonate. For example, the total mass of the neonate dummy 100 is set to about 2600 g, and the backbone member 105 is made of a material having strength and flexibility substantially equivalent to those of the neonate. The mass of the head part 100 is set to 800 g, about 30% of the total mass, similarly to the neonate. Each member forming the neonate dummy 100 is also made of a material having strength and flexibility substantially equivalent to those of the neonate.

When the aforementioned neonate dummy 100 is employed for a dynamic test, the head part 101 behaves equally to the head of an actual neonate due to the separated structures of the head part 101 and the body part 102, whereby a movement of the head of the neonate and the value of affection applied to the head resulting from a collision can be correctly grasped.

The body part 102 includes the backbone member 105 corresponding to the backbone of the neonate, and the neck part is formed on the upper region of the backbone member 105. This structure replicates the skeleton of the neonate, whereby the head part 101 and the neck part behave equally to the head and the neck of the actual neonate in the dynamic test, whereby movements of the head and the neck of the neonate and the values of affection applied to the head and the neck can be correctly grasped in the dynamic test.

The head part 101 is pivotally coupled to the neck part to be anteroposteriorly and laterally rotatable. This structure more correctly replicates the skeleton of the neonate so that the head part 101 and the neck part behave more equally to the head and the neck of the actual neonate in the dynamic test, whereby movements of the head and the neck of the neonate and the values of affection applied to the head and the neck can be more correctly grasped in the dynamic test.

The acceleration sensors S2 and S3 are provided on the positions corresponding to the upper and lower ends of the cervical vertebrae of the neonate respectively, whereby the quantity of displacement of the cervical vertebrae of the neonate can be measured in the dynamic test for correctly grasping the movement of the neck and the value of affection applied to the neck. Consequently, the mechanism of cervical disorder resulting from an impact can be clarified.

Further, the acceleration sensors S1, S4 and S5 are provided on the centroidal positions of the head part 101, the thoracic part and the lumbar part respectively, whereby movements of the thoracic part and the lumbar part of the neonate and the values of affection applied to the thoracic part and the lumbar part can be more correctly grasped in the dynamic test.

The body part 102 includes the arm parts 103 and the leg parts 104, which have joints moving similarly to those of the neonatal body, whereby behavior of the neonate can be correctly grasped in the dynamic test.

The neonate dummy 100 according to the present invention, developed to be mainly set on a juvenile safety seat for an automobile and applied to a dynamic test on a car crash, is also applicable to a dynamic test with reference to a nursery instrument such as a baby carriage.

The neonate dummy according to the present invention enables grasp of a movement of the head of a neonate, the values of impacts applied to the thoracic part and the abdominal part (including the lumbar part) and the value of affection on the cervical vertebrae as well as clarification of the mechanism of cervical disorder resulting from an impact in a dynamic test.

Accordingly, a "posture not compressing the respiratory tract", a "posture not hindering abdominal respiration" and a "posture preventing reduction of oxygen saturation" can be researched and developed in development of a nursery instrument for protecting the life of a baby. Further, a "structure for preventing skull fracture", a "structure for stabilizing the head and protecting the cervical vertebrae", a "structure protecting the backbone having the central nervous system", a "structure for preventing the pelvis, the ribs and the collar bones from fracture" and a "structure protecting the internal organs" can be researched and developed for protecting the body of a baby. In addition, a "structure for ensuring a sound sleep necessary for growth", a "structure protecting the brain from unpleasant irritation", a "structure for preventing the hip joint from dislocation", a "structure supporting (compensating for) immature thermoregulation", a "structure improving development of motor nerves and muscles", a "structure protecting growth in each developmental stage" and a "structure for protecting development of emotion/keeping mental stability/emotionally bringing up the baby" can be researched and developed for protecting growth of the baby.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A neonate dummy, employed for a dynamic test, comprising;

a bead part;

a body part including a bar member corresponding to a backbone of a neonate, with a neck part that is formed on an upper region of said bar member and that is coupled with said head part, wherein said head part and said body part are physically separated from each other with said neck part interposed therebetween; and first and second acceleration sensors provided at positions corresponding to upper and lower ends of cervical vertebrae of a neonate respectively.

2. The neonate dummy according to claim 1, wherein said head part is pivotally coupled to said neck part to be anteroposteriorly rotatable.

3. The neonate dummy according to claim 1, wherein said head part is pivotally coupled to said neck part to be laterally rotatable.

4. The neonate dummy according to claim 1, wherein said body part includes a thoracic part and a lumbar part, and further comprising third, fourth and fifth acceleration sensors provided at a centroidal position of said head part, a centroidal position of said thoracic part and a centroidal position of said lumbar part respectively.

5. The neonate dummy according to claim 1, wherein said body part includes arm parts and leg part, and joints moving similarly to joints of a body of a neonate are provided on said arm parts and said leg parts respectively.

6. A neonate dummy simulating a size, mass, and dynamic reaction of a human neonate subjected to forces, said neonate dummy comprising;

a body;

a backbone bar member extending in said body and including a neck part protruding out of said body;

a head articulately coupled to an upper end of said neck part;

a first acceleration sensor arranged at said upper end of said neck part; and a second acceleration sensor arranged at a lower end of said neck part proximate to where said backbone bar member passes into said body.

7. The neonate dummy according to claim 6, wherein said backbone bar member continuously includes said neck part, a thoracic backbone part, and a lumbar backbone part extending continuously in succession.

8. The neonate dummy according to claim 7, wherein said backbone bar member is a unitary bar-shaped member integrally including said neck part, said thoracic backbone part, and said lumbar backbone part.

9. The neonate dummy according to claim 7, further comprising a third acceleration sensor arranged in said head, a fourth acceleration sensor arranged at said thoracic backbone part, and a fifth acceleration sensor arranged at said lumbar backbone part.

10. The neonate dummy according to claim 6, wherein said neck part is an integral continuous part of said backbone bar member.

* * * * *

UNITED STATES PATENT AND TRADEMARK OFFICE
CERTIFICATE OF CORRECTION

PATENT NO. : 6,749,433 B2
DATED : June 15, 2004
INVENTOR(S) : Kassai et al.

It is certified that error appears in the above-identified patent and that said Letters Patent is hereby corrected as shown below:

Title page,
Item [75], Inventors, after "Yamei Liu," replace "Osaka (JP)" by -- Beijing, Peoples Republic of China --.

Column 6,
Line 9, after "a", replace "bead" by -- head--;
Line 33, after "leg", replace "part," by -- parts, --.

Signed and Sealed this

Thirtieth Day of November, 2004

JON W. DUDAS
*Director of the United States Patent and Trademark Office*